Nov. 18, 1969     J. J. RAUTENBACH     3,478,735
PRESSURE BURNER
Filed Feb. 13, 1968
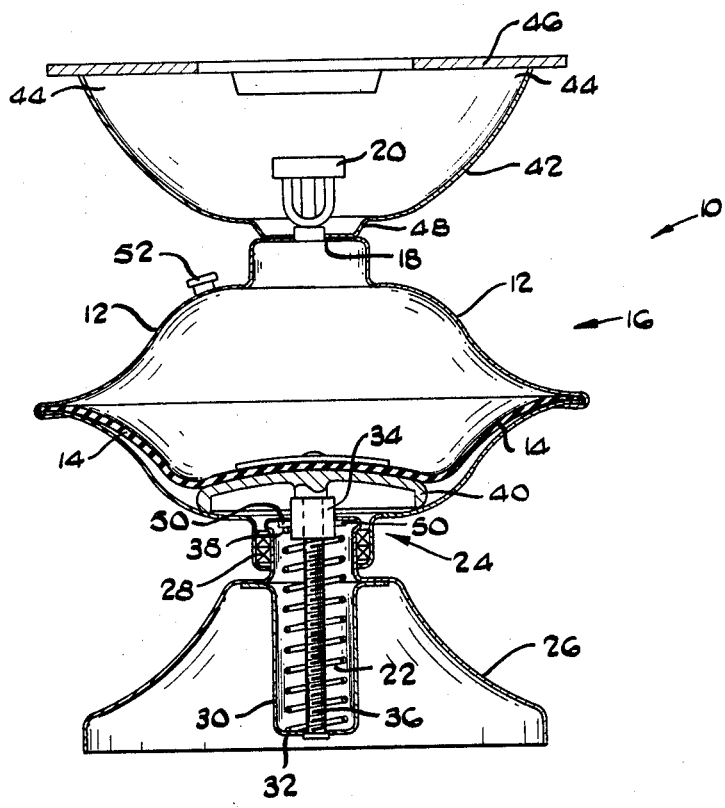
Inventor:
Jacobus Johannes Rautenbach
By
Karl W. Flocks
Attorney United States Patent Office 3,478,735
Patented Nov. 18, 1969

3,478,735
PRESSURE BURNER
Jacobus Johannes Rautenbach, van Wyks Restante, Muldersdrift, Transvaal, Republic of South Africa
Filed Feb. 13, 1968, Ser. No. 705,091
Int. Cl. F24c 5/02
U.S. Cl. 126—44                           8 Claims

ABSTRACT OF THE DISCLOSURE

A liquid fuel pressure burner which has a fuel chamber having a deformable defining wall resiliently compressed by adjustable spring means to exert pressure on liquid fuel inside the fuel chamber.

---

This invention relates to a liquid fuel pressure burner.

According to the invention, there is provided a liquid fuel pressure burner comprising walls defining a fuel chamber having connection means for connecting to a burner element, at least one of the walls being deformable, resilient spring means arranged to exert pressure on liquid fuel in the chamber via the deformable wall, and adjustable varying means to vary the pressure exerted by the spring means.

The deformable wall may conveniently be in the form of a flexible diaphragm. It may be of any suitable material, such as for example a suitable synthetic rubber.

The adjustable varying means may comprise a screw-threaded nut and spindle co-operating with the spring means, with the spindle abutting the deformable wall, the adjusability of the varying means being provided by rotation of the spindle and the nut relative to each other.

The spindle may be connected to the deformable wall and the fuel chamber may be rotatably mounted on a base portion, the rotation of the spindle and the nut relative to each other being effected by rotation of the fuel chamber relatively to the base portion.

The spring means may be a helical spring located in a cylindrical casing in the base portion, the spring having its one end secured to the base portion, and its other end connected to the nut.

The burner may have an upwardly directed bowl-type radiant heat reflector located on the fuel chamber, the bowl having circumferentially spaced arms for receiving a support plate, and the bowl defining an initial heating trough around the connection means. Thus, the bowl can prevent excessive heating of the upper wall of the fuel chamber, and thus the fuel in the fuel chamber.

The burner element for connection to the connection means of the fuel chamber may conveniently be of a type for vaporizing fuel when heated. Thus, the burner element may be of the type for use in direct heating of matter placed above it, for use as a radiator, or for lighting.

The invention is now described by way of example, with reference to the accompanying drawing, which shows a sectional side elevation of a liquid fuel pressure burner.

With reference to the drawing, reference numeral 10 refers generally to a liquid fuel pressure burner comprising walls 12 and 14 defining a fuel chamber 16 having connection means 18 connected to a burner element 20, and the wall 14 being deformable, resilient spring means 22 arranged to exert pressure on the deformable wall 14 to reduce the volume of the chamber 16, and adjustable varying means 24 to vary the pressure exerted by the spring means 22.

The deformable wall 14 is in the form of a flexible diaphragm of synthetic rubber.

The fuel chamber 16 is rotatably mounted on a base portion 26 by means of bearings 28. The bearings 28 are arranged to prevent separation of the chamber 16 from the base portion 26.

The spring means 22 is in the form of a helical spring located in a cylindrical casing 30 in the base portion 26, with the helical spring having its one end 32 secured to the casing 30.

The adjustable varying means 24 comprises a screw-threaded nut 34 and spindle 36 co-operating with the spring means 22.

The nut 34 is connected to the end 38 of the helical spring of the spring means 22. The nut 34 is slidably receivable in an aperture provided in the casing 30 and is displaceable towards and away from the base portion 26.

The spindle 36 has its one end connected to a dished pressure plate 40 which is connected to the deformable wall 14, and the spindle 36 extends along the axis of the spring means 22.

The adjustability of the varying means 24 is accordingly provided by rotation of the spindle 36 relatively to the nut 34, which is effected by rotation of the fuel chamber 16 relatively to the base portion 26.

The burner 10 has an upwardly directed bowl-type radiant heat reflector 42 mounted on the fuel chamber 16. The reflector 42 has circumferentially spaced arms 44 supporting a support plate 46.

The support plate 46 is adapted to support utensils or matter to be heated or cooked.

The reflector 42 is shaped to define an initial heating trough 48 around the burner element 20 for receiving fuel to be burnt for initial heating of the burner element 20.

The nut 34 has two pins 50 extending outwardly to prevent displacement of the nut upwardly out of the cylindrical casing 30.

The fuel chamber 16 has a fuel inlet 52.

If desired, a burner outlet valve (not shown) may be provided either in the connection means 18 or in the burner element 20.

The reflector 42 is adapted to reflect heat from the burner element 20, away from the fuel chamber, thereby utilizing heat more efficiently and also preventing undue heating of the fuel chamber.

If desired, the deformable wall 14 may be in the form of a disc connected to the pressure plate 40, the disc being connected to the walls 12 of the fuel chamber 16 by means of a bellows arrangement.

In use, the fuel chamber is rotated relative to the base portion to the position shown in the drawing where no pressure is exerted by the spring means on the deformable wall. The chamber is then filled with fuel, and the burner element is heated by burning fuel in the initial heating trough. When the burner element has been heated sufficiently to vaporize fuel passing through it, the fuel chamber is rotated relative to the base portion to compress the spring means, thereby forcing fuel out of the burner element. The compression of the spring means can be varied to vary the size of the flame on the burner element, and at any suitable setting, a fairly constant pressure can be maintained for a reasonable period through the resiliency of the spring means.

Embodiments of this invention have the advantage that, in use, the fuel chamber will contain substantially no gases. Thus, types of fuels which can normally not be used in conventional burners because of the possible explosion hazards, may be used. Further, the burner of this invention is robust and portable, can burn quite effectively even in inverted position, and the size of the flame can be readily varied and adjusted.

What I claim is:
1. A liquid fuel pressure burner comprising a base portion; walls defining a fuel chamber rotatably mounted on the base portion, at least one of the walls being deformable and the fuel chamber having connection means for connection to a burner element; resilient spring means arranged to exert pressure via the deformable wall on liquid fuel in the chamber; and adjustable varying means adapted to be adjusted to vary the pressure exerted by the spring means, the adjustable varying means comprising a screw-threaded nut and spindle cooperating with the spring means, the spindle being connected to the deformable wall, and the spindle being adapted to be rotated relatively to the nut by rotation of the fuel chamber relatively to the base portion to vary the pressure exerted by the spring means.

2. A burner according to claim 1, having a heat reflector located on the fuel chamber to reflect heat away from the fuel chamber.

3. A burner according to claim 1, in which the deformable wall is a flexible diaphragm.

4. A burner according to claim 1, in which the spring means is a helical spring located in a cylindrical casing in the base portion, the spring having its one end secured to the base portion, and its other end connected to the nut.

5. A burner according to claim 2, in which the reflector can serve also as a support member, adapted to support utensils over the burner element.

6. A burner according to claim 2, in which the reflector is of bowl shape and is adapted to receive a pool of volatile fuel at the base of the burner element.

7. A liquid fuel pressure burner comprising a base portion; walls defining a fuel chamber rotatably mounted on the base portion, at least one of the walls being deformable and the fuel chamber having connection means for conection to a burner element; resilient spring means arranged to exert pressure via the deformable wall on liquid fuel in the chamber; and varying means adapted to be adjusted to vary the pressure exerted by the spring means, the varying means being adapted to be adjusted by rotation of the fuel chamber relatively to the base portion.

8. A burner according to claim 7, in which the varying means comprises a screw-threaded nut and spindle cooperating with the spring means and adapted to be rotated relatively to each other by rotation of the fuel chamber relatively to the base portion.

References Cited

UNITED STATES PATENTS 1,433,632 10/1922 Lucas _____ 126—44
1,716,981 6/1929 Sacks _____ 222—95

FOREIGN PATENTS 1,379,296 12/1963 France.

EDWARD G. FAVORS, Primary Examiner

U.S. Cl. X.R.

222—95